United States Patent
Iqbal et al.

(10) Patent No.: US 11,361,507 B1
(45) Date of Patent: Jun. 14, 2022

(54) ARTICULATED BODY MESH ESTIMATION USING THREE-DIMENSIONAL (3D) BODY KEYPOINTS

(71) Applicant: NVIDIA Corporation, Santa Clara, CA (US)

(72) Inventors: Umar Iqbal, San Jose, CA (US); Pavlo Molchanov, Mountain View, CA (US); Jan Kautz, Lexington, MA (US); Yun Rong Guo, Richmond Hill (CA); Cheng Xie, Vancouver (CA)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/315,060

(22) Filed: May 7, 2021

Related U.S. Application Data

(60) Provisional application No. 63/155,813, filed on Mar. 3, 2021.

(51) Int. Cl.
*G06T 17/20* (2006.01)
*G06T 19/20* (2011.01)

(52) U.S. Cl.
CPC .............. *G06T 17/20* (2013.01); *G06T 19/20* (2013.01); *G06T 2219/2021* (2013.01)

(58) Field of Classification Search
None
See application file for complete search history.

(56) References Cited

PUBLICATIONS

Shashank Tripathi; Siddhant Ranade; Ambrish Tyagi; Amit Agrawal, "PoseNet3D: Learning Temporally Consistent 3D Human Pose via Knowledge Distillation", Nov. 28, 2020, IEEE, 2020 International Conference on 3D Vision (3DV).*
Zhong Li, Lele Chen, Celong Liu, Yu Gao, Yuanzhou Ha, Chenliang Xu, Shuxue Quan, Yi Xu, "3D Human Avatar Digitization from a Single Image", Nov. 2019, ACM, VRCAI '19: The 17th International Conference on Virtual-Reality Continuum and its Applications in Industry, Article No. 12, pp. 1-8.*

(Continued)

*Primary Examiner* — Robert Bader
(74) *Attorney, Agent, or Firm* — Leydig, Voit & Mayer, Ltd.

(57) ABSTRACT

Estimating a three-dimensional (3D) pose and shape of an articulated body mesh is useful for many different applications including health and fitness, entertainment, and computer graphics. A set of estimated 3D keypoint positions for a human body structure are processed to compute parameters defining the pose and shape of a parametric human body mesh using a set of geometric operations. During processing, 3D keypoints are extracted from the parametric human body mesh and a set of rotations are computed to align the extracted 3D keypoints with the estimated 3D keypoints. The set of rotations may correctly position a particular 3D keypoint location at a "joint", but an arbitrary number of rotations of the "joint" keypoint may produce a twist in a connection to a child keypoint. Rules are applied to the set of rotations to resolve ambiguous twists and articulate the parametric human body mesh according to the computed parameters.

20 Claims, 12 Drawing Sheets

(56) References Cited

PUBLICATIONS

Pramod Murthy, Hammad T. Butt, Sandesh Hiremath, Alireza Khoshhal, Didier Stricker, "Learning 3D joint constraints from vision-based motion capture datasets", Jun. 25, 2019, SpringerOpen, IPSJ Transactions on Computer Vision and Applications (2019), issue 11, article 5.*
Iqbal, U., et al., "Weakly-Supervised 3D Human Pose Learning via Multi-view Images in the Wild," IEEE Explore, pp. 5243-5252.
Bogo, F., et al., "Keep it smpl: Automatic estimation of 3D human pose and shape from a single image," In ECCV, 2016.
Cao, Z., et al., "Openpose: Realtime multi-person 2d pose estimation using part affinity fields," TPAMI, 2019.
Chen, C., et al., "3D human pose estimation = 2D pose estimation + matching," In CVPR, 2017.
Moon, G., et al., "I2l-meshnet: Image-to-lixel prediction network for accurate 3d human pose and mesh estimation from a single rgb image," In ECCV, 2020.
Choi, H., et al., "Pose2mesh: Graph convolutional network for 3d human pose and mesh recovery from a 2d human pose," In ECCV, 2020.
Choutas, V., et al., "Monocular expressive body regression through body-driven attention," In ECCV 2020.
Dabral, R., et al., "Learning 3d human pose from structure and motion," In ECCV, 2018.
Dobrowolski, P., "Swing-twist decomposition in Clifford algebra," ArXiv, abs/1506.05481, 2015.
Drover, Dylan, et al., "Can 3d pose be learned from 2d projections alone?" In ECCV Workshops, 2018.
Guler, R., et al., "HoloPose: Holistic 3d human reconstruction in-the-wild," In CVPR, 2019.
Guler, R., et al., "DensePose: Dense human pose estimation in the wild," In CVPR, 2018.
Hossain, M., et al., "Exploiting temporal information for 3d pose estimation," In ECCV, 2018.
Ionescu, C., et al., "Human3.6M: Large scale datasets and predictive methods for 3D human sensing in natural environments," TPAMI, 36(7):1325-1339, 2014.
Iqbal, U., et al., "A dual-source approach for 3D human pose estimation in a single image," CVIU, 2018.
Iqbal, U., et al., "Hand pose estimation via 2.5D heatmap regression," In ECCV, 2018.
Joo, H, et al., "Exemplar fine-tuning for 3d human model fitting towards in-the-wild 3d human pose estimation," arXiv preprint arXiv:2004.03686, 2020.
Kanazawa, A., et al., "End-to-end recovery of human shape and pose," In CVPR, 2018.
Kocabas, M., et al., "Vibe: Video inference for human body pose and shape estimation," In CVPR, 2020.
Kocabas, M., et al., "Self-supervised learning of 3d human pose using multi-view geometry," In CVPR, 2019.
Kolotouros, N., et al., "Learning to reconstruct 3d human pose and shape via model-fitting in the loop," In ICCV, 2019.
Kolotouros, N., et al., "Convolutional mesh regression for single-image human shape reconstruction," In CVPR, 2019.
Kundu, J., et al., "Appearance consensus drive self-supervised human mesh recovery," In ECCV, 2020.
Kundu, J., et al., "Self-supervised 3d human pose estimation via part guided novel image synthesis," In CVPR, 2020.
Li, S., et al., "3D human pose estimation from monocular images with deep convolutional neural network," In ACCV, 2014.
Li, S., et al., "Maximum-margin structured learning with deep networks for 3D human pose estimation," In ICCV, 2015.
Li, Z., et al., "On boosting single-frame 3d human pose estimation via monocular videos," In ICCV, 2019.
Lin, T., et al., "Microsoft COCO: Common objects in context," In ECCV, 2014.
Loper, M., et al., "MoSh: Motion and shape capture from sparse markers," SIGGRAPH Asia, 33(6):220:1-220:13, 2014.
Luvizon, D., et al., "2d/3d pose estimation and action recognition using multitask deep learning," In CVPR, 2018.
Martinez, J., et al., "A simple yet effective baseline for 3D human pose estimation," In ICCV, 2017.
Mehta, D., et al., "Monocular 3d human pose estimation in the wild using improved cnn supervision," In 3DV, 2017.
Mitra, R., et al., "Multiview-consistent semi-supervised learning for 3d human pose estimation," In CVPR, 2020.
Moreno-Noguer, F., "3D human pose estimation from a single image via distance matrix regression," In CVPR, 2017.
Novotny, D. et al., "C3dpo: Canonical 3d pose networks for non-rigid structure from motion," In ICCV, 2019.
Pavlakos, G., et al., "Expressive body capture: 3d hands, face and body from a single image," In CVPR, 2019.
Pavlakos, G., et al., "Texturepose: Supervising human mesh estimation with texture consistency," In ICCV, 2019.
Pvalakos, G., et al., "Ordinal depth supervision for 3D human pose estimation," In CVPR, 2018.
Pavlakos, G., et al., "Coarse-to-fine volumetric prediction for single-image 3D human pose," In CVPR, 2017.
Pavlakos, G., et al., "Harvesting multiple views for marker-less 3d human pose annotations," In CVPR, 2017.
Pavllo, D., et al., "3d human pose estimation in video with temporal convolutions and semi-supervised training," In CVPR 2019.
Popa, A., et al., "Deep multitask architecture for integrated 2D and 3D human sensing," In CVPR, 2017.
Rhodin, H., et al., "Unsupervised geometry-aware representation learning for 3d human pose estimation," In ECCV, 2018.
Rhodin, H., et al., "Learning monocular 3d human pose estimation from multi-view images," In CVPR, 2018.
Ronchi, M., et al., "It's all relative: Monocular 3d human pose estimation from weakly supervised data," In BMVC, 2018.
Sengupta, A., et al., "Synthetic training for accurate 3d human pose and shape estimation in the wild," In BMVC 2020.
Song, J., et al., "Human body model fitting by learned gradient descent," In ECCV, 2020.
Sun, K., et al., "Deep high-resolution representation learning for human pose estimation," In CVPR, 2019.
Sun, X., et al., "Compositional human pose regression," In ICCV, 2017.
Sun, X., et al., "Integral human pose regression," In ECCV, 2018.
Sun, Y., et al., "Human mesh recovery from monocular images via a skeleton-disentangled representation," In ICCV, 2019.
Sarandi, I., et al., "Metric-scale truncation-robust heatmaps for 3d human pose estimation," In FG, 2020.
Tekin, B., et al., "Structured prediction of 3D human pose with deep neural networks," In BMVC, 2016.
Tekin, B., et al., "Learning to fuse 2D and 3D image cues for monocular body pose estimation," In ICCV, 2017.
Tome, D., et al., "Lifting from the deep: Convolutional 3D pose estimation from a single image," In CVPR, 2017.
Von Marcard, T., et al., "Recovering accurate 3D human pose in the wild using IMUS and a moving camera," In ECCV, 2018.
Wandt, B., et al., "RepNet: Weakly supervised training of an adversarial reprojection network for 3d human pose estimation," In CVPR, 2019.
Wang, C., et al., "Distill knowledge from NRSfM for weakly supervised 3d pose learning," In ICCV, 2019.
Wu, J., et al., "Single image 3d interpreter network," In ECCV, 2016.
Yao, Y., et al., "Monet: Multiview semi-supervised keypoint detection via epipolar divergence," In ICCV, 2019.
Zanfir, A., et al., "Weakly supervised 3d human pose and shape reconstruction with normalizing flows," In ECCV, 2020.
Zhou, K., et al., "Hemlets pose: Learning part-centric heatmap triplets for accurate 3d human pose estimation," In ICCV, 2019.
Zhou, X., et al., "Towards 3d human pose estimation in the wild: a weakly-supervised approach," In ICCV, 2017.
Zhou, X., et al., "Deep kinematic pose regression," In ECCV Workshops, 2016.

* cited by examiner

ARTICULATED BODY MESH ESTIMATION USING THREE-DIMENSIONAL (3D) BODY KEYPOINTS

CLAIM OF PRIORITY

This application claims the benefit of U.S. Provisional Application No. 63/155,813 titled "Human Body Mesh Estimation Using Three-Dimensional (3D) Body Keypoints," filed Mar. 3, 2021, the entire contents of which is incorporated herein by reference.

BACKGROUND

Estimating a 3D pose and shape of a human body mesh is useful for many different applications including health and fitness (exercise, medical, apparel), entertainment (gaming, animation, film, virtual reality), and computer graphics (robotics, human-computer interaction). Estimating the 3D pose accurately is a difficult task due to the large amounts of appearance variation, self-occlusions, and complexity of articulated poses. The pose can be represented by a fixed set of points in 3D space, usually joints, called landmarks or keypoints. A parametric body mesh model is defined having mesh parameters corresponding to the pose and shape. Conventional techniques estimate the parameters of the parametric body mesh model from two dimensional (2D) images using a convolutional neural network (CNN) with a fully-connected layer in the end. However, learning a mapping between the 2D images of a body object and mesh parameters using the CNN is highly non-linear. Therefore, the conventional techniques often suffer from low localization accuracy. Specifically, while these conventional techniques estimate parameters that are plausible, the resulting articulated body meshes are often misaligned with the visual content in the 2D images. In particular, the wrists and feet regions of the articulated body meshes are often misaligned. There is a need for addressing these issues and/or other issues associated with the prior art.

SUMMARY

Embodiments of the present disclosure relate to articulated body mesh estimation using three-dimensional (3D) body keypoints. Systems and methods are disclosed that process a set of estimated 3D keypoint positions for a human body structure to compute parameters defining the pose and shape of a parametric human body mesh using a set of geometric operations. The estimated 3D keypoints may be generated from an image that is processed by a neural network. The neural network may be trained to estimate the 3D keypoints using full and/or weak supervision. Conventional training techniques often require ground-truth body shape annotations which are very hard to acquire. Therefore, in an embodiment, unlabeled multi-view images are used along with a collection of images annotated with 2D poses for training the neural network to estimate the 3D keypoints.

In addition to acquiring the estimated 3D keypoints, 3D keypoints are extracted from the parametric human body mesh. A set of rotations is computed to geometrically align the extracted 3D keypoints with the estimated 3D keypoints. The set of rotations may correctly position a particular 3D keypoint location at a "joint", but an arbitrary number of rotations of the "joint" keypoint may produce a twist in a connection to a child keypoint. In an embodiment, a twist may result from a rotation greater than zero degrees of the joint keypoint in a connection to a child keypoint. Rules are applied to the set of rotations to resolve ambiguous twists and articulate the parametric human body mesh according to the computed parameters. In an embodiment, the articulated parametric human body mesh is refined to improve the pose and shape by removing discrepancies between 3D to 2D projections of the estimated 3D keypoints and 3D keypoints extracted from the articulated parametric human body mesh.

In contrast to conventional systems, computing parameters based on the set of rotations and refining the parameters based on the image typically offers significantly better alignment of the articulated parametric human body mesh to image content. In particular, while conventional techniques may map images to mesh parameters that are plausible, the resulting meshes often suffer from low localization accuracy. Specifically, misalignments between wrist and feet regions in the images compared with corresponding regions of an articulated mesh.

Systems and methods are disclosed that estimate a 3D mesh by receiving estimated 3D keypoints for a 3D body and computing a set of geometric transformations that align extracted 3D keypoints for a 3D mesh model with the estimated 3D keypoints. Based on a kinematic structure for the 3D mesh model, at least one twist resulting from application of the geometric transformations to the extracted 3D keypoints is removed to produce pose parameters for the 3D mesh model. The 3D mesh model is articulated according to the pose parameters to produce an articulated 3D mesh model that approximates a pose of the 3D body. In an embodiment, the pose parameters, shape parameters, translation, and scale applied to the 3D mesh model are refined based on a reprojection error. In an embodiment, the reprojection error corresponds to discrepancies between 3D to 2D projections of the estimated 3D keypoints and 3D keypoints extracted from the articulated 3D mesh model. In an embodiment, the articulated 3D mesh model is a human body mesh. In other embodiments, the articulated 3D mesh model is an animal, robot, or other object that may change in pose and/or shape.

BRIEF DESCRIPTION OF THE DRAWINGS

The present systems and methods for articulated body mesh estimation using 3D body keypoints are described in detail below with reference to the attached drawing figures, wherein.

DETAILED DESCRIPTION

Systems and methods are disclosed related to articulated body mesh estimation using 3D body keypoints. A set of estimated 3D keypoint positions for a body are processed to compute parameters defining the pose and shape of a parametric human body mesh using a set of geometric operations. The set of estimated 3D keypoints correspond to the pose of the body in a 2D image and may be generated by a neural network that has been trained to estimate the 3D keypoints for input images. A 3D mesh estimation system computes the pose and shape parameters that are applied to the parametric human body mesh, articulating the parametric human body mesh to estimate the pose and shape of the body in the 2D image.

3D keypoints are extracted from the parametric human body mesh and an initial set of rotations are computed to align the extracted 3D keypoints with the estimated 3D keypoints. Rules are applied to the initial set of rotations to resolve ambiguous twists and produce pose and shape parameters for articulating the parametric human body mesh. The pose and shape parameters may be refined to improve alignment between the articulated parametric human body mesh and the body.

Figure 1A:
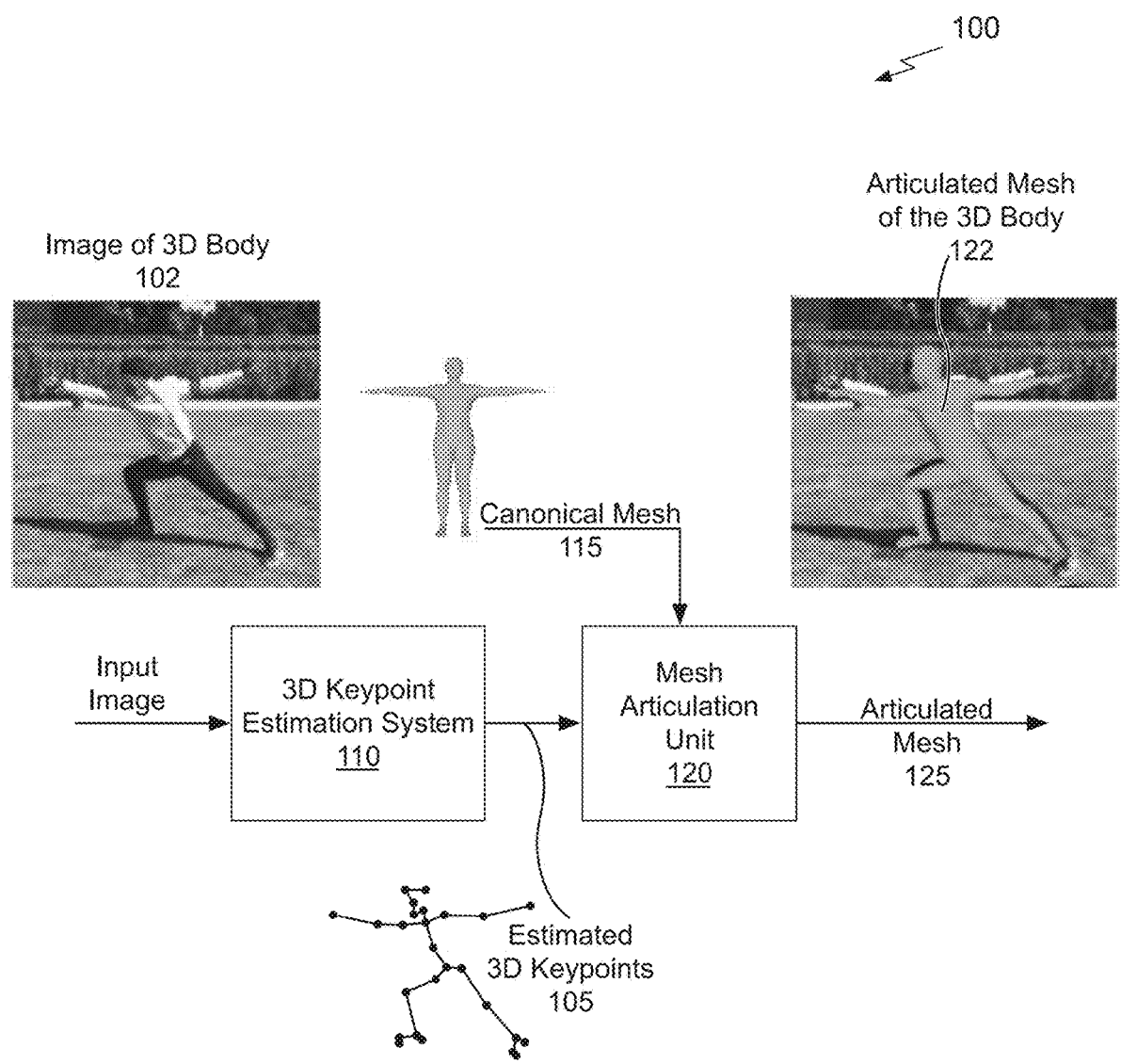
FIG. 1A illustrates a block diagram of an example 3D mesh estimation system suitable for use in implementing some embodiments of the present disclosure.

FIG. 1A illustrates a block diagram of an example 3D mesh estimation system 100 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the 3D mesh estimation system 100 is within the scope and spirit of embodiments of the present disclosure.

A goal of the 3D mesh estimation system 100 is to reconstruct a full 3D body mesh M from an input image I of a pre-localized person. In an embodiment, the input image is a color image. As shown in FIG. 1A, a 3D keypoint estimation system 110 receives an image of a 3D body 102 and outputs locations of estimated 3D keypoints 105 for the 3D body depicted in the input image. The 3D keypoint estimation system 110 may be implemented as a neural network model. The estimated 3D keypoints may be generated from an image that is processed by a neural network that is trained using full and/or weak supervision, as described by Umar Iqbal, Pavlo Molchanov, and Jan Kautz in "Weakly Supervised 3D Human Pose Learning via Multi-View Images in the Wild," *Proceedings of the IEEE/CVF Computer Vision and Pattern Recognition (CVPR)*, 2020, pp. 5243-5252. A technique for estimating 3D keypoints for hands is described by Umar Iqbal, Pavlo Molchanov, Thomas Breuel, Juergen Gall, and Jan Kautz in "Hand Pose Estimation via 2.5D Latent Heatmap Regression," *Proceeding of the European Conference on Computer Vision (ECCV)*, 2018, pp. 118-134.

A canonical mesh 115 (e.g., 3D mesh model or parametric human body mesh) and the estimated 3D keypoints 105 are used by a mesh articulation unit 120 to compute pose θ and shape β parameters for articulating the canonical mesh 115, producing an articulated mesh 125, such as articulated mesh of the 3D body 122. In an embodiment, the canonical mesh 115 is the Skinned Multi-Person Linear (SMPL) model described by Matthew Loper, Naureen Mahmood, Javier Romero, Gerard Pons-Moll, and Michael J. Black in "SMPL: A Skinned Multi-Person Linear Model," *ACM SIGGRAPH Asia Conference*, Volume 34, Article 248, 2015.

In an embodiment, the 3D keypoint estimation system 110 is a neural network that is trained to learn a keypoint regressor $\mathcal{F}$ (I), receiving the image I as input and producing the 3D positions $X=\{x_k\}_{k \in K}$ of K body keypoints. Because the estimated 3D keypoints 105 are used to articulate the canonical mesh 115, the number of keypoints should be sufficient to obtain finer details about the 3D body, such as positions for surfaces of the head and feet. The estimated 3D keypoints 105 may include additional keypoints beyond the commonly used 17 keypoints to provide finer details. For example, 3D head pose (yaw, pitch, roll) in the 3D body typically cannot be fully defined by the 3D positions of the neck and top-of-the-head only. Therefore, the additional 3D keypoints may include positions on the face to describe the full head pose. In an embodiment, 3D positions are estimated for 26 keypoints including keypoints for eyes, ears, nose, small and big toes, and heels.

Training the 3D keypoint estimation system 110 can be a challenge because existing training datasets do not provide ground-truth annotations for the additional keypoints. Therefore, in an embodiment, the 3D keypoint estimation system 110 is jointly trained using fully-supervised losses for keypoints for which ground-truth 3D annotations are available and weakly-supervised losses for the remaining keypoints (e.g., eyes, nose, ears, toes, and heels). The weakly supervised losses rely on multi-view consistency and 2D pose labels (annotations). In an embodiment, the 3D keypoint estimation system 110 generates estimated 3D keypoints 105 using a 2.5D heatmap representation, which yields 3D keypoints that are well-aligned with the image content. In an embodiment, the 3D positions of the estimated 3D keypoints 105 are represented in absolute camera space. Therefore, in an embodiment, the mesh articulation unit 120 generates articulated mesh 125 in the absolute camera space enabling projection of the articulated mesh 125 onto the image plane using perspective-projection for use refining the articulated mesh 125.

Given the estimated 3D keypoints 105, the mesh articulation unit 120 articulates the canonical mesh 115 to match the pose of the 3D body depicted in the input image (e.g., image of 3D body 102). In an embodiment, the canonical mesh 115 is the Skinned Multi-Person Linear (SMPL) model that represents a body mesh. The SMPL model can be articulated using a linear function M(θ, β) that takes as input the pose parameters $\theta \Sigma \mathbb{R}^{24 \times 3}$ and the shape parameters $\beta \in \mathbb{R}^{10}$ and produces an articulated triangle mesh $M \in \mathbb{R}^{V \times 3}$ with V=6980 vertices. The pose parameters θ consist of local 3D-rotation matrices, in axis-angle format, corresponding to each joint in the pre-defined kinematic structure E of the human body. The mesh articulation unit 120 may estimate the pose parameters θ of the canonical mesh 115 from the estimated 3D keypoints 105 using a set of geometrical transformations. In an embodiment, a procedure used to estimate the pose parameters is fully analytic and the computational cost is small.

In contrast with the 3D keypoint estimation system 110, conventional neural network based techniques for estimating a mesh from input images encode mesh vertex coordinates in a heatmap-like representation and require large amounts of images annotated not only with body pose and shape labels, but also with segmented part labels. In contrast, the 3D keypoint estimation system 110 portion of the 3D keypoint estimation system 110 does not require any 3D annotations and can be trained using weakly-labeled data. Even in the fully-supervised settings, 3D keypoint estimation system 110 uses only 3D keypoint annotations and does not require shape labels or any kind of additional labels such as part segmentation. Notably, the mesh articulation unit 120 performs computations and, in contrast with neural network-based solutions, does not require any training.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
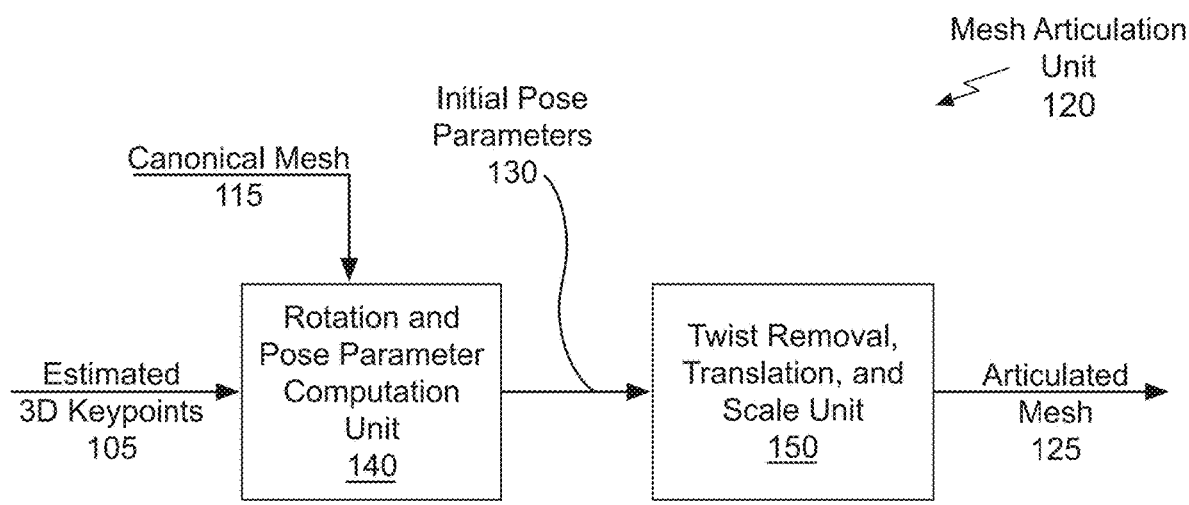
FIG. 1B illustrates a block diagram of an example mesh articulation unit of FIG. 1A suitable for use in implementing some embodiments of the present disclosure.
Figure 1B:
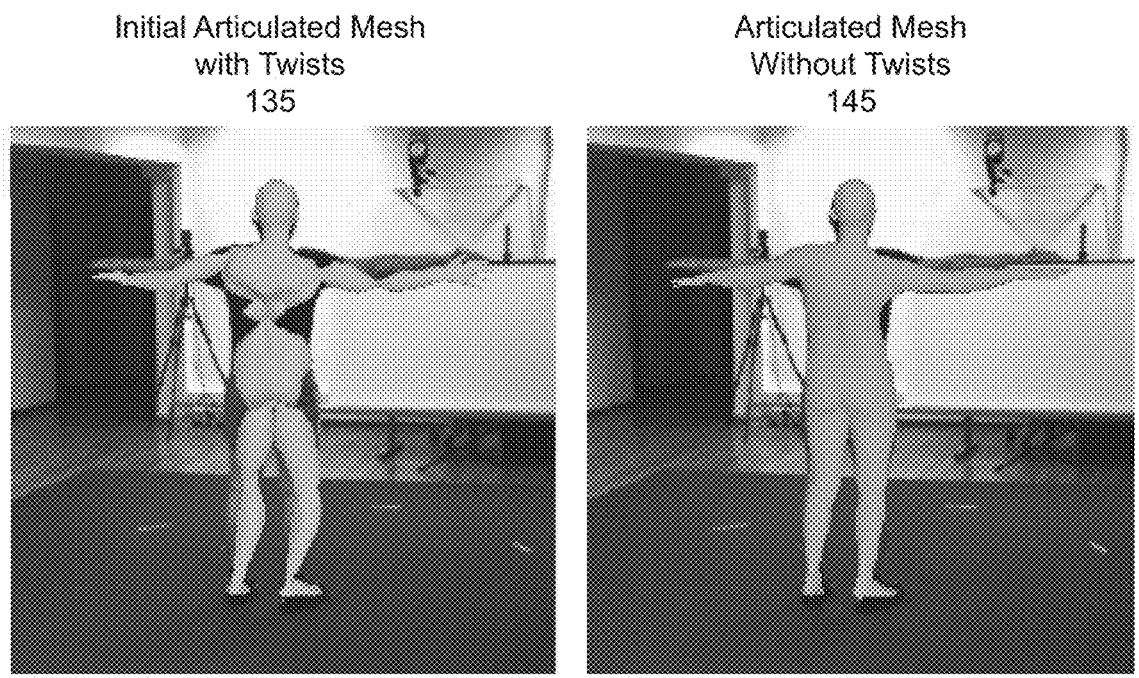

FIG. 1B illustrates a block diagram of an example mesh articulation unit 120 of FIG. 1A suitable for use in implementing some embodiments of the present disclosure. The mesh articulation unit 120 includes a rotation and pose parameter computation unit 140 and a twist removal, translation, and scale unit 150. The rotation and pose parameter computation unit 140 computes initial pose θ and shape β parameters 130 associated with the canonical mesh 115 using a set of geometrical transformations to define vertex positions of the articulated mesh 125.

In an embodiment, keypoints are not annotated for the canonical mesh 115 and the estimated 3D keypoints 105 are generally not coincident with specific vertices that define the canonical mesh 115. Therefore, positions of the estimated 3D keypoints 105 are calculated for the canonical mesh 115. For example, a position of a 3D keypoint centered in the shoulder portion of the canonical mesh 115 may be calculated by the mesh articulation unit 120 to produce an extracted 3D keypoint for the shoulder joint. The rotation and pose parameter computation unit 140 extracts canonical 3D keypoints $\overline{X}$ from the canonical mesh 115, and the canonical 3D keypoints $\overline{X}$ correspond in terms of kinematic structure to the estimated 3D keypoints 105 (X). Establishing a correspondence between $\overline{X}$ and X enables articulation of the canonical mesh 115, according to X, to produce the articulated mesh 125.

Based on the extracted 3D keypoints and the estimated 3D keypoints 105, the rotation and pose parameter computation unit 140 computes a set of rotations that, when applied to the extracted 3D keypoints $\overline{X}$, articulates the extracted 3D keypoints $\overline{X}$ to align with the estimated 3D keypoints X. In other words, the articulation of the extracted 3D keypoints according to the set of rotations is similar to the articulation of the estimated 3D keypoints. However, application of the set of rotations to the extracted 3D keypoints typically results in twists, as shown in an image of an initial articulated mesh with twists 135. A particular 3D keypoint location is aligned at a "joint" but an arbitrary number of twists of the "joint" keypoint may occur, producing a twist. In an embodiment, a twist may result from a rotation greater than zero degrees of the joint keypoint in a connection to a child keypoint. As shown in the initial articulated mesh with twists 135, the particular aligned 3D keypoint at the right elbow joint is rotated, causing a bone connecting to a child keypoint location (wrist) to be twisted, causing a pinching at the right elbow joint. The initial articulated mesh with twists 135 is articulated according to the set of rotations encoded in the initial pose parameters 130 that are produced by the rotation and pose parameter computation unit 140.

The rotation and pose parameter computation unit 140 may remove twists for the extracted 3D keypoints having multiple children using information encoded in the kinematic structure of the canonical mesh 115 that constrains relative positions of the multiple child keypoints. However, ambiguous twists may remain for the extracted 3D keypoints having a single child. The twist removal, translation, and scale unit 150 applies a set of rules to the set of rotations to remove the ambiguous twists and compute pose parameters that are applied to the canonical mesh 115 to produce the articulated mesh without twists 145. The initial articulated mesh with twists 135 has ambiguous twists around keypoints with a single child and does not include twists around keypoints with multiple children. The extracted 3D keypoints are articulated to produce both the initial articulated mesh with twists 135 and the articulated mesh without twists 145.

Assume $\overline{M}$ is a body mesh in the canonical pose, such as the canonical mesh 115, and $\overline{X}=W\overline{M}=\{\overline{x}_k\}_{k \in K}$ are the extracted 3D keypoint positions in the canonical pose. Here $W \in \mathbb{R}^{K \times V}$ is a weight matrix that defines the contribution of every vertex of the canonical mesh 115 to the extracted 3D keypoints. The goal is to use X and $\overline{X}$ to calculate a set of rotations $\hat{\theta}=\{\theta_k\}_{k \in K}$ such that the mesh $\hat{M}=M(\xi(\hat{\theta}), \beta=0^{1 \times 10})$ has an articulation similar to that of the estimated 3D keypoints 105, X. Here the function $\xi(.)$ converts the order of rotation matrices from a multiple keypoint skeleton structure used for the estimated 3D keypoints 105 to the skeleton of the canonical mesh 115 for which the same or a different number of keypoints are extracted. In an embodiment, the estimated 3D keypoints 105 include 26 keypoints and the skeleton of the canonical mesh 115 is the SMPL model for which 26 keypoints may be extracted. In an embodiment, an axis-angle representation of the rotation matrices is used. C(k) is defined as the children keypoints of keypoint k and N(k) as the set of all keypoints adjacent to k, as defined by the kinematic structure ε. For N(k), in an embodiment, a maximum of three adjacent keypoints are considered. If a keypoint has more than three adjacent keypoints, the three keypoints with the highest detection confidence as provided by the 3D keypoint estimation system 110 are chosen.

Three different rules may be applied by the rotation and pose parameter computation unit 140 to compute an initial estimation of the global rotations as the set of rotations: 1) For keypoints with one child rotation is estimated with ambiguous twist which is later compensated, 2) for keypoints with multiple children the ambiguity in twist is removed using the other keypoints associated with a connected joint, and 3) no rotation is assumed for childless keypoints. These rules are summarized as follows:

$$\theta_k^g = \begin{cases} \alpha_1(\overline{x}_{c(k)} - \overline{x}_k, x_{c(k)} - x_k) & \text{if } |C(k)| = 1 \\ \alpha_2(\overline{X}_k^N, X_k^N) & \text{if } |C(k)| > 1 \\ 0^{1 \times 3} & \text{otherwise,} \end{cases} \quad (1)$$

where $\overline{X}_k^N = \{\overline{x}_n\}_{n \in N(k)}$ and $X_k^N = \{x_n\}_{n \in N(k)}$.

For the keypoints with one child, the rotation is computed as the angle applied to the vector perpendicular to the plane formed by the bones $\overline{x}_{c(k)} - \overline{x}_k$ and $x_{c(k)} - x_k$ in the canonical and estimated poses, respectively. $c(k)$ corresponds to the index of the child of keypoint k, and the function $\alpha_1(v_1, v_2)$ provides the rotation in axis-angle format as follows:

$$\alpha_1(v_1, v_2) = \arccos\left(\frac{v_1^T v_2}{\|v_1\| \|v_2\|}\right) \cdot \left(\frac{v_1 \times v_2}{\|v_1 \times v_2\|}\right), \quad (2)$$

where the rightmost term represents the axis of rotation and the leftmost term corresponds to the angle of rotation.

It is important to note that the rotation estimated in this manner is inherently ambiguous as any arbitrary twist about the child vector can be applied without affecting the position of the child keypoint. Ambiguous twists are removed by the twist removal, translation, and scale unit 150 after the rotation and pose parameter computation unit 140 calculates rotations for all of the extracted 3D keypoints, as explained further herein.

For the keypoints with multiple children, the keypoint rotation can be estimated more precisely than for keypoints with a single child. For the keypoints with multiple children, one of the child vectors is used to estimate the rotation up to an arbitrary twist rotation using equation (2), as previously described. Then, the correct twist is estimated using another child vector. For ease of understanding, consider the pelvis keypoint that has hips and torso keypoints as children. Let $\{x_p, x_t, x_{lh}, x_{rh}\}$ and $\{\overline{x}_p, \overline{x}^t, \overline{x}_{lh}, \overline{x}_{rh}\}$ be the 3D positions of the pelvis, torso, left hip, and right hip in the estimated and canonical pose, respectively. The hip vectors in the estimated and canonical pose are defined as:

$$u_1 = x_{rh} - x_{lh} \text{ and } \overline{u}_1 = \overline{x}_{rh} - \overline{x}_{lh},$$

respectively. Then rotation $\theta'$ between the hip vectors is calculated using equation (2) i.e., $$\theta' = \alpha_1(\overline{u}_1, u_1). \quad (3)$$

Next, the correct twist rotations about the hip vector for best aligning the torso are estimated. The torso vectors in the estimated and canonical pose are computed as $$u_2 = x_t - x_p \text{ and } \overline{u}_2 = \overline{x}_t - \overline{x}_p, \quad (4)$$

respectively. If the torso is orthogonal to the hip vector ($u_2 \perp u_1$ and $\overline{u}_2 \perp \overline{u}_1$), the required additional rotation between $\overline{u}_2$ and $u_2$ will be about the hip vector and represent the twist that perfectly aligns the torso. When this is not the case, the closest possible alignment can be found by considering components of the torso vectors that are orthogonal. The orthogonal components can be obtained by projecting the torso vectors onto the plane perpendicular to the hip vectors as $$v = u_1 \times (u_2 \times u_1) \text{ and } \overline{v} = \overline{u}_1 \times (\overline{u}_2 \times \overline{u}_1). \quad (5)$$

Given the projections, the twist rotation is calculated as:

$$\theta'' = \alpha_1(\phi(\theta', \overline{v}), v), \quad (6)$$

where $\phi(\theta', \overline{v})$ represents rotation of vector $\overline{v}$ by $\theta'$ using Rodriguez formula. The final rotation is defined as the composition of the two rotations:

$$\alpha_2(\overline{X}_k^N, X_k^N) = \theta'' \cdot \theta' \quad (7)$$

In an embodiment, for the keypoints with multiple children, it is assumed that the keypoints in $N(k)$ move rigidly, and the rotation is estimated as a rigid rotation between $\overline{X}_k^N$ and $X_k^N$ as $$\alpha_2(\overline{X}_k^N, X_k^N) = \min_\theta \sum_{\substack{\overline{x}_i \in \overline{X}_k^N \\ x_i \in X_k^N}} \psi(x_i)(\phi(\theta, \overline{x}_i) - x_i), \quad (9)$$

where $\phi(\theta, \overline{x})$ represents rotating the vector $\overline{x}$ with $\theta$ using Rodriguez formula, and $\psi(x_i)$ corresponds to the detection confidence of keypoint i as provided by the keypoint regressor $\mathcal{F}(I)$. The equation (9) can be solved in closed-form using singular value decomposition.

The calculated set of rotations $\theta_k^g$ to align the extracted 3D keypoints with the estimated 3D keypoints 105 are global rotations. To be able to use the set of rotations in the function $M(\xi(\theta), \beta)$ for articulating the canonical mesh 115, the set of rotations is converted to local rotations as follows:

$$\theta_k = \theta_{p(k)}^{g-1} \cdot \theta_k^g \quad (8)$$

where $p(k)$ is the index of the parent of keypoint k. The root keypoint has no parent so it remains unchanged.

In an embodiment, the rotation and pose parameter computation unit 140 performs the geometric transformations according to equation (1) to compute the initial pose parameters 130. In an embodiment, the initial pose parameters 130 are a set of global rotations. In an embodiment, the initial pose parameters 130 are a set of local rotations. In an embodiment, the initial pose parameters 130 include shape parameters $\beta$ that are default values for the canonical mesh 115.

The twist removal, translation, and scale unit 150 receives the initial pose parameters 130 and removes the ambiguous twists. When the initial pose parameters 130 include global rotations, the global rotations are converted to local rotations. The twist removal, translation, and scale unit 150 may also receive data (e.g., kinematic structure) for the canonical mesh 115 and a camera position associated with the input image. Although the rotation and pose parameter computation unit 140 removes twists for keypoints with multiple children, ambiguous twists from the rotations of keypoints with only one child remain and are removed by the twist removal, translation, and scale unit 150.

A reasonable choice to remove the unnecessary twists from the rotations of the keypoints with one child is to default to the twist from the canonical pose (which is zero by definition). A swing-after-twist decomposition may be used to adjust the local rotations to have a twist of zero. Specifically, the estimated local rotation is decomposed into its swing and twist components, and then the rotation is set to the swing component, while the twist component is discarded. A swing-after-twist decomposition technique is described by P. Dobrowolski. In "Swing-Twist Decomposition in Clifford Algebra" ArXiv, abs/1506.05481, 2015, the entire contents of which is incorporated herein by reference.

After removing the ambiguous twists in the set of rotations defined by the pose parameters 130, the articulated body mesh remains positioned at the origin and its global scale is unknown. Because the estimated 3D keypoints 105 provide absolute 3D pose including approximate bone length scales, the twist removal, translation, and scale unit 150 calculates the global translation $t \in \mathbb{R}^3$ and global scale $s \in \mathbb{R}$ for the articulated mesh using Procrustes analysis between the keypoints of the canonical mesh 115 and the estimated 3D keypoints 105:

$$\hat{s}, \hat{t} = \underset{s,t}{\operatorname{argmin}} \|W(sM+t)\|_2^2. \tag{9}$$

Translating and scaling the local rotations provides the pose parameters for articulating the canonical mesh 115 to produce the articulated mesh 125 in the absolute camera coordinate system.

Figure 2A:
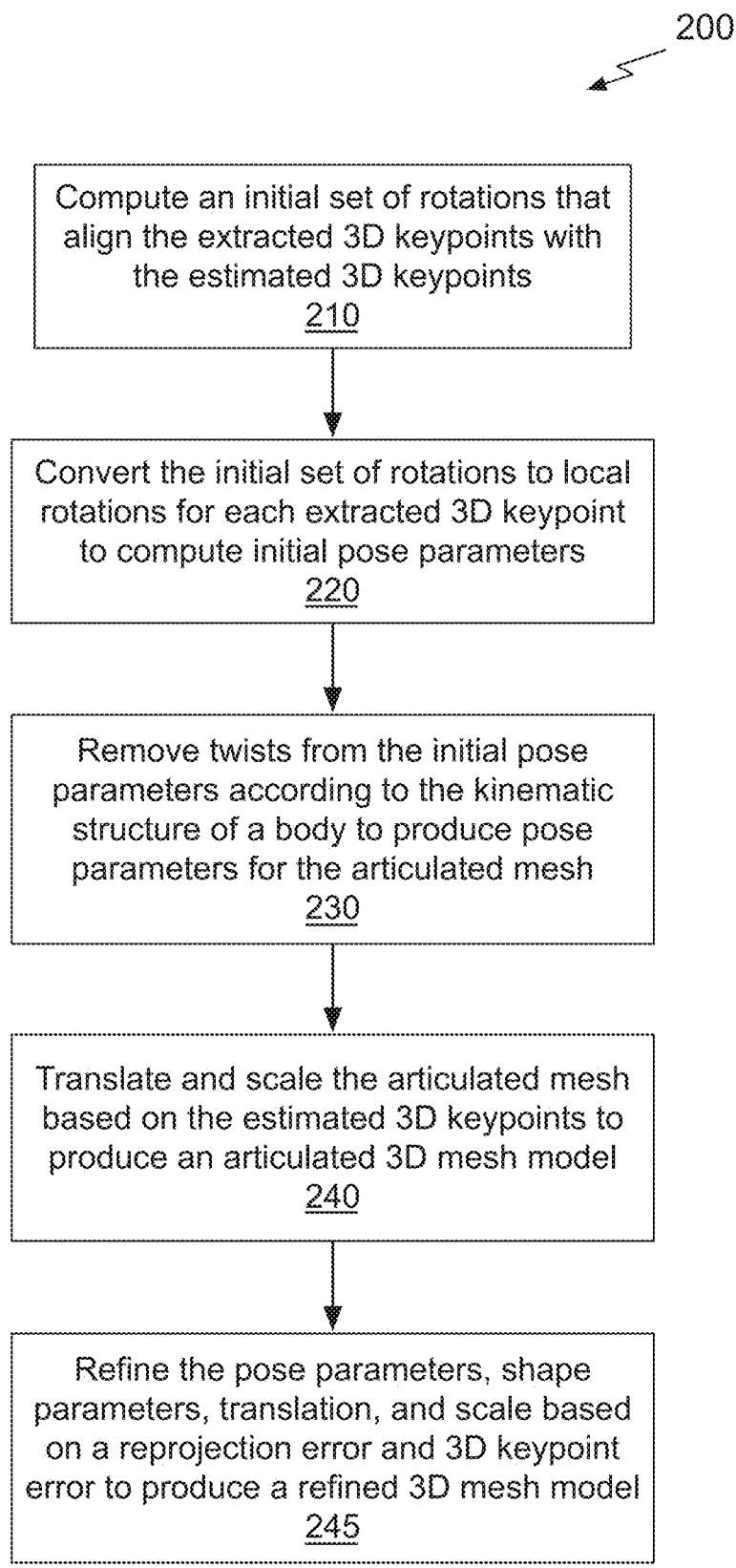
FIG. 2A illustrates a flowchart of a method for estimating a 3D mesh, in accordance with an embodiment.

FIG. 2A illustrates a flowchart of a method 200 for estimating a 3D mesh, in accordance with an embodiment. Each block of method 200, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 200 is described, by way of example, with respect to the 3D mesh estimation system 100 of FIG. 1A and the mesh articulation unit 120 of FIG. 1B. However, this method may additionally or alternatively be executed by any one system, or any combination of systems, including, but not limited to, those described herein. Furthermore, persons of ordinary skill in the art will understand that any system that performs method 200 is within the scope and spirit of embodiments of the present disclosure.

At step 210, an initial set of rotations is computed that aligns the extracted 3D keypoints with the estimated 3D keypoints. In an embodiment, the initial set of rotations is computed according to equation (1). In an embodiment, twists from the rotations of keypoints with multiple children are removed in the initial set of rotations. At step 220, the initial set of rotations is converted to local rotations for each extracted 3D keypoint to compute initial pose parameters 130. In an embodiment, the initial set of rotations is converted to local rotations according to equation (8).

At step 230, ambiguous twists are removed from the initial pose parameters 130 according to the kinematic structure of a body (e.g., the canonical mesh 115) to produce pose parameters for the articulated mesh 125. In an embodiment, ambiguous twists are removed from extracted 3D keypoints having one child according to the swing-after-twist decomposition technique.

At step 240, the articulated mesh is translated and scaled based on the estimated 3D keypoints 105 to produce an articulated 3D mesh model, as the articulated mesh 125. At step 245, the pose parameters, shape parameters, translation, and scale are refined based on a reprojection error and 3D keypoint error to produce a refined 3D mesh model.

As illustrated in FIG. 1B, the articulated 3D mesh model that is overlaid on an image of a 3D body in the articulated mesh without twists 145 aligns closely with the 3D body. However, the hands of the articulated 3D mesh model are not as accurately aligned as the other portions of the articulated 3D mesh model and are slightly lower compared with the hands of the 3D body. The articulated mesh 125 (e.g., the articulated 3D mesh model) may be refined using the estimated 3D keypoints 105 that are reprojected to produce 2D keypoints and respective projected 2D keypoints of the articulated mesh 125. The articulated mesh may also be refined using the estimated 3D keypoints 105 and 3D keypoints extracted from the articulated mesh 125.

Figure 2B:
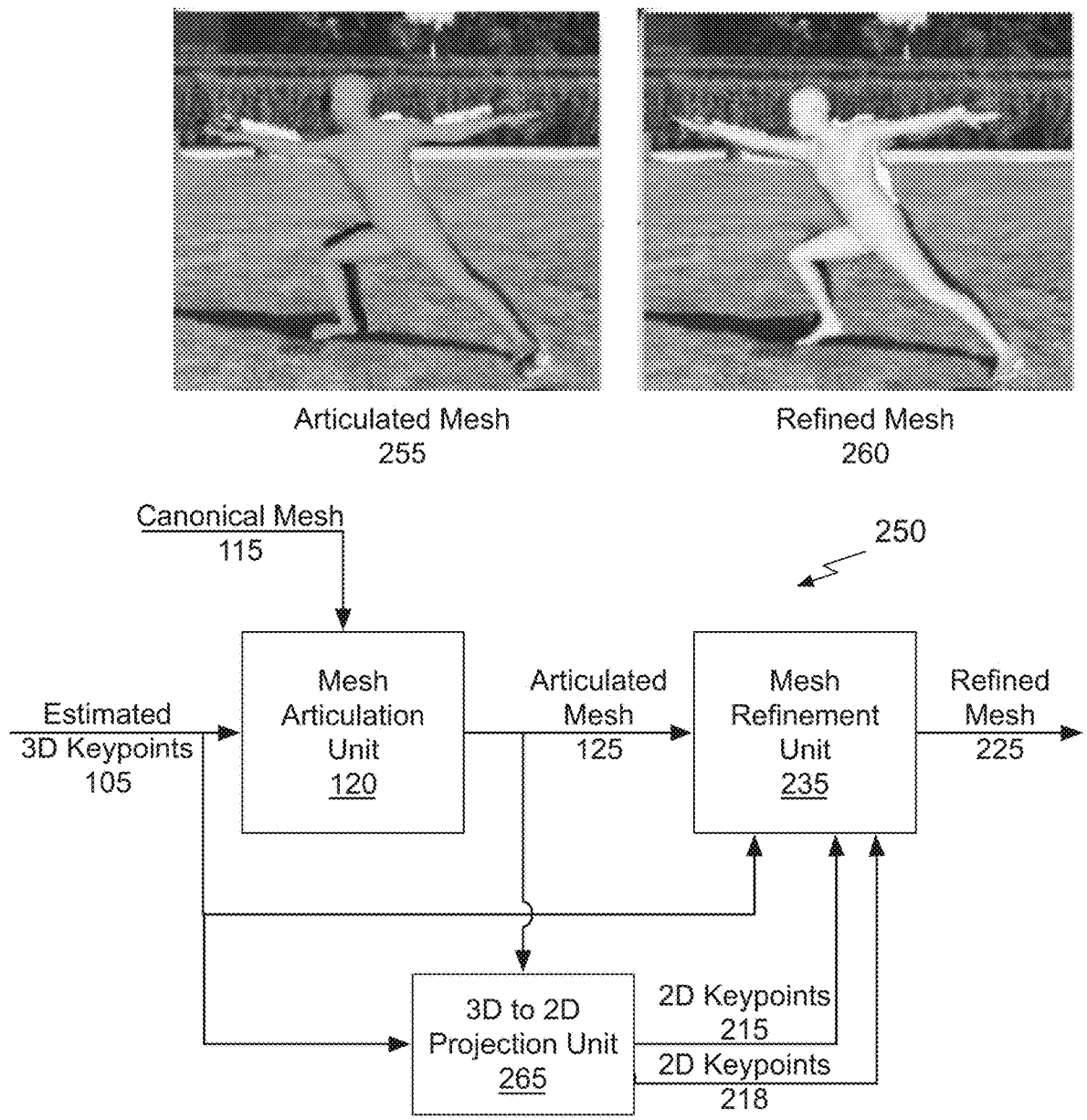
FIG. 2B illustrates a block diagram of another example 3D mesh estimation system suitable for use in implementing some embodiments of the present disclosure.

FIG. 2B illustrates a block diagram of another example 3D mesh estimation system 250 suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the 3D mesh estimation system 250 is within the scope and spirit of embodiments of the present disclosure.

In addition to the mesh articulation unit 120, the 3D mesh estimation system 250 includes a mesh refinement unit 235 and a 3D to 2D projection unit 265. The mesh refinement unit 235 processes the pose and shape parameters associated with the articulated mesh 125 using 2D keypoints 215 and the estimated 3D keypoints 105 to produce a refined mesh 225. For example, the pose and shape parameters associated with an articulated mesh 255 may be refined to articulate a refined mesh 260. Note that the arms of the refined mesh 260 align more closely with the arms of a 3D body in an image from which the estimated 3D keypoints are generated compared with the arms of the articulated mesh 255.

While the approach for mesh articulation using estimated 3D keypoints 105 already provides sufficiently good mesh estimates, there are two problems that may be addressed to improve the accuracy of the articulated mesh 125. First, the estimated 3D keypoints 105 may not exactly match with the skeleton structure of the canonical mesh 115. For example, in contrast to the 3D keypoints extracted from the canonical mesh 115, the 3D keypoint estimation system 110 does not necessarily provide any keypoints on the collar bones. Also, small errors in one of the estimated 3D keypoints 105 can propagate to the entire articulated mesh 125. For example, application of an incorrect rotation for a pelvis keypoint will impact the articulation of many other extracted 3D keypoints and will result in articulated extracted 3D keypoints that are very different from the estimated 3D keypoints 105. Furthermore, errors may also result from occlusions. Second, the shape parameters $\beta$ of the articulated mesh 125 should be estimated to fully capture the 3D body details.

The mesh refinement unit 235 may refine the pose parameters $\theta$ to remove discrepancies in the pose and also estimate the body shape parameters $\beta$. The mesh refinement unit 235 may also refine the global translation t, and global scale s. The pose parameters $\theta$, shape $\beta$, global translation t, and global scale s generated for the articulated mesh may be optimized using an energy minimization formulation:

$$\hat{\theta}, \hat{\beta}, \hat{t}, \hat{s} = \underset{\theta, \beta, t, s}{\operatorname{argmin}} \mathcal{L}(\theta, \beta, t, s), \tag{10}$$

where $\mathcal{L}(\theta, \beta, t, s)$ consists of four error terms $$\mathcal{L}_{(\theta, \beta, t, s)} = \mathcal{L}_{2D} + \omega_1 \mathcal{L}_{3D} + \omega_3 \mathcal{L}_\theta + \omega_2 \mathcal{L}_\beta. \tag{11}$$

The error term $\mathcal{L}_{2D}$ is the reprojection error. In an embodiment, $\omega_1 = 500$, $\omega_2 = 4.78$, and $\omega_3 = 5$. The 3D to 2D projection unit 265 reprojects the estimated 3D keypoints

105 according to the camera position to generate the 2D keypoints 215. The resulting final articulated mesh 125 generated by the mesh articulation unit 120 using equation (9) is in the absolute camera coordinate system. The 3D to 2D projection unit 265 uses perspective-projections to project the skeleton of the articulated mesh 125 onto the 2D image plane according to the camera position to generate 2D keypoints 218. In an embodiment, keypoints of the articulated mesh 125 that most closely correspond to 2D annotations provided by the 3D keypoint estimation system 110 are projected to generate the 2D keypoints 218. In an embodiment, 54 keypoints are extracted from the articulated mesh 125. In an embodiment, a number of keypoints that are extracted from the articulated mesh 125 is greater than the number of keypoints extracted from the canonical mesh 115. $\mathcal{L}_{2D}$ measures the discrepancies between the 2D keypoints 215 provided by the estimated 3D keypoints 105 and the projection of a skeleton of the articulated mesh 125:

$$\mathcal{L}_{2D} = \Sigma \|P(K,X) - P(K,W(sM+t))\|_2^2, \quad (12)$$

where K is the intrinsic camera matrix and P(.,.) represents projection on the image plane. $\mathcal{L}_{3D}$ measures the difference between estimated 3D keypoints 105 and the skeleton of the articulated mesh 125:

$$\mathcal{L}_{3D} = \Sigma \|X - W(sM+t)\|_2^2. \quad (13)$$

When one or more estimated 3D keypoints 105 are not available for specific articulated keypoints of the articulated mesh 125 (e.g., keypoints located at the color bones, along the spine, etc.), the rotation matrices for the one or more unavailable keypoints are initialized as zeros in equation (1), but are optimized using equation (10).

The error terms $\mathcal{L}_\theta$ and $\mathcal{L}_\beta$ correspond to pose prior and shape prior terms as defined for the canonical mesh 115, respectively. Specifically, $\mathcal{L}_\theta$ favors plausible pose parameters and helps in reducing the ambiguities due to missing keypoints and differences in the skeleton structures of the canonical mesh 115 and the structure associated with the estimated 3D keypoints 105. In an embodiment, the error term $\mathcal{L}_\theta$ is computed as described by Federica Bogo, Angjoo Kanazawa, Christoph Lassner, Peter Gehler, Javier Romero, Michael J. Black in "Keep it SMPL: Automatic Estimation of 3D Human Pose and Shape from a Single Image," ECCV 2016, pp 561-578. The term $\mathcal{L}_\beta$ is a regularization for shape parameters β such that the optimized shape of the refined mesh 225 is not distant from the mean shape of the canonical mesh 115.

The previously computed values of θ, s, and t may be provided by the mesh articulation unit 120 and used by the mesh refinement unit 235 as initial values for the optimization. Because the initialized values are already quite accurate, in some embodiments, the optimization converges within 100 iterations without the need of a multi-stage optimization strategy as required by conventional techniques.

Figure 3A:
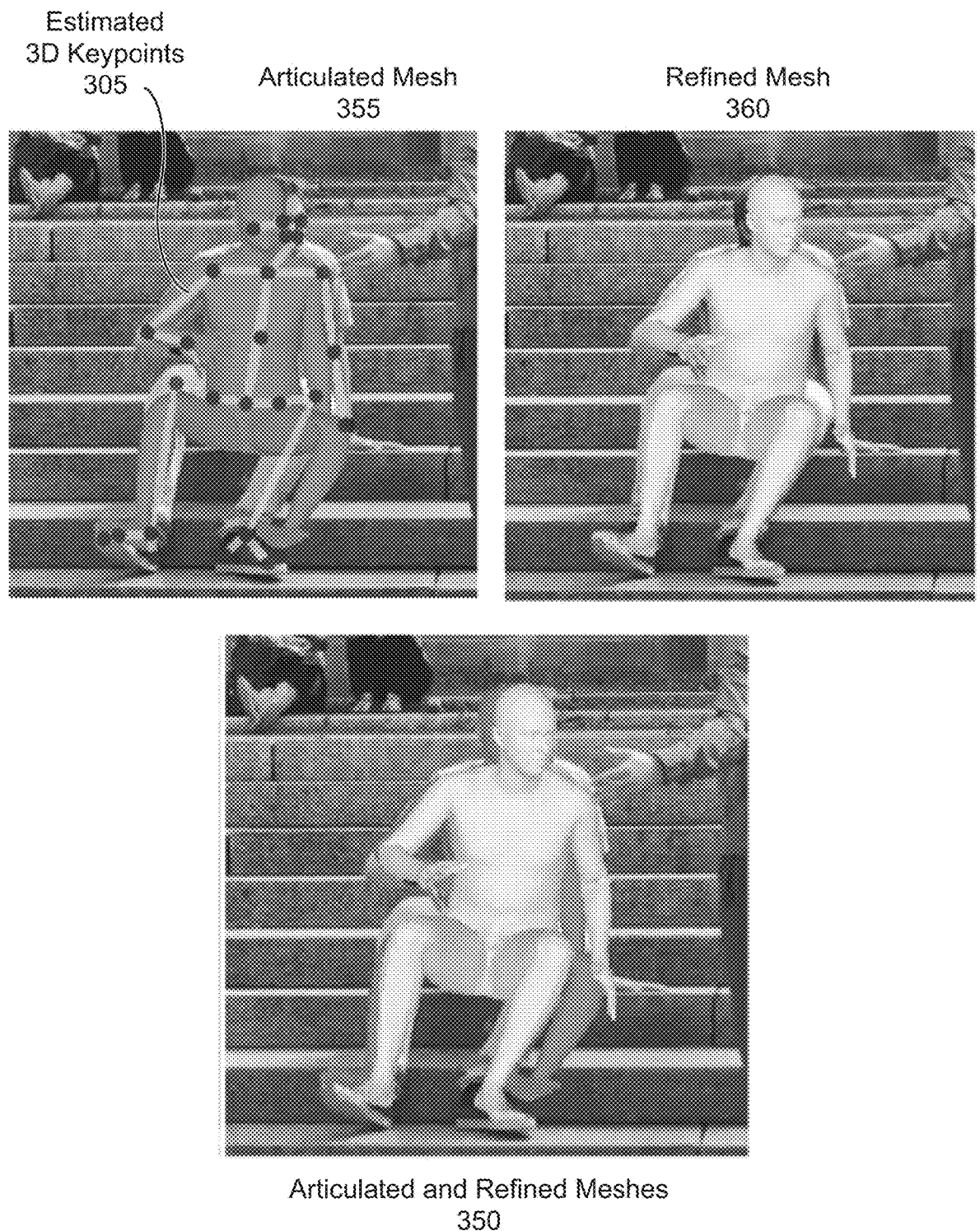
FIG. 3A illustrates images of an articulated 3D mesh with and without refinement in accordance with some embodiments of the present disclosure.

FIG. 3A illustrates images of an articulated 3D mesh with and without refinement in accordance with some embodiments of the present disclosure. For illustration purposes, estimated 3D keypoints 305, articulated mesh 355, refined mesh 360, and articulated and refined meshes 350 are each overlaid on an image of a 3D body for which an 3D mesh is recovered. The estimated 3D keypoints 305 are the estimated 3D keypoints 105 generated by the 3D keypoint estimation system 110 processing the image of the 3D body shown in FIG. 3A. The articulated mesh 355 is produced by the mesh articulation unit 120. The articulated mesh 355 and estimated 3D keypoints 305 are processed by the 3D to 2D projection unit 265 and the mesh refinement unit 235 to produce the refined mesh 360. The articulated mesh 355 and the refined mesh 360 are overlaid on the image as articulated and refined meshes 350 to more clearly illustrate differences in accuracy between the meshes. Notably, the localization accuracy of the refined mesh 360 is improved compared with the articulated mesh 355, particularly for the wrist and feet regions.

Figure 3B:
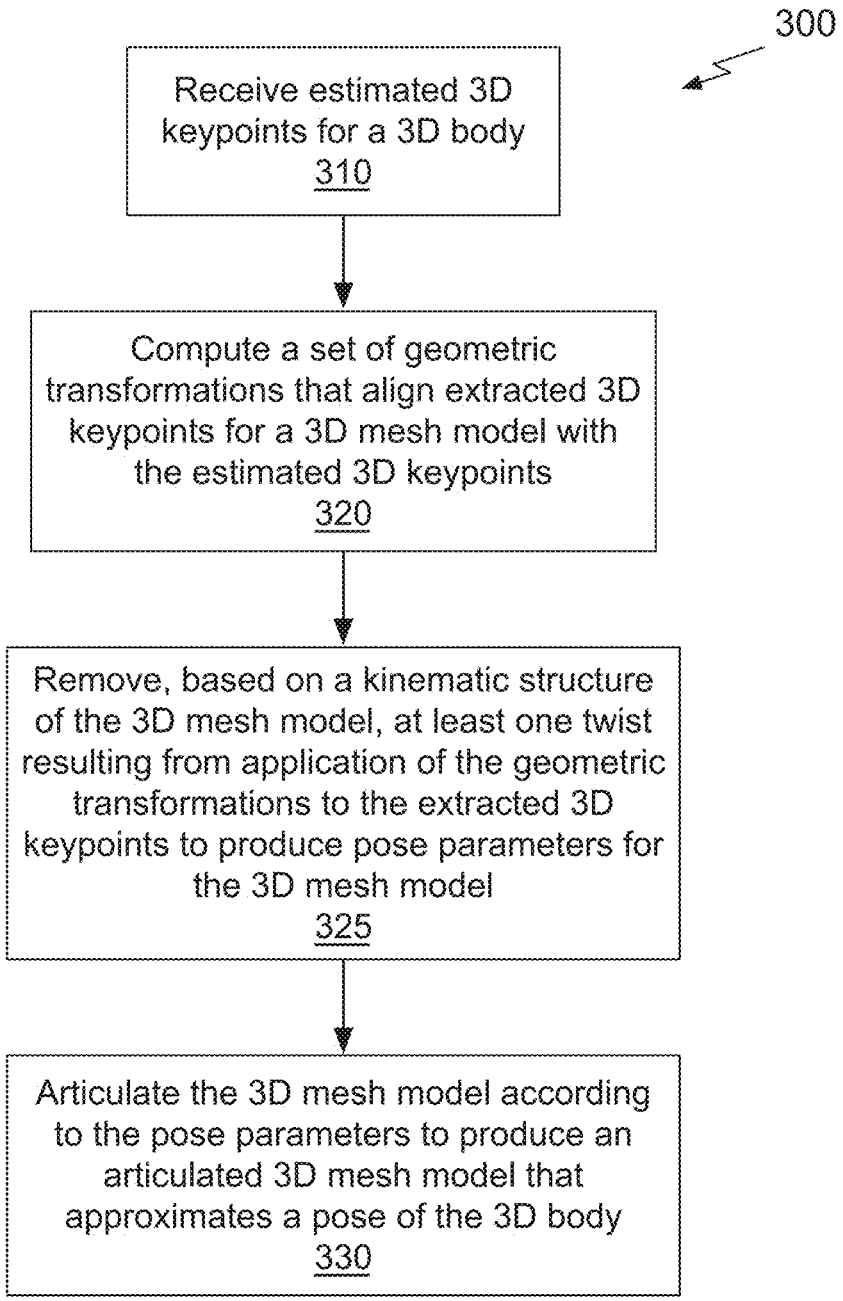
FIG. 3B illustrates another flowchart of a method for estimating a 3D mesh suitable for use in implementing some embodiments of the present disclosure.

FIG. 3B illustrates another flowchart of a method 300 for estimating a 3D mesh suitable for use in implementing some embodiments of the present disclosure. Each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the 3D mesh estimation systems 100 and 250 of FIGS. 1A and 2B. However, this method may additionally or alternatively be executed by any one system, or any combination of systems, including, but not limited to, those described herein. Furthermore, persons of ordinary skill in the art will understand that any system that performs method 300 is within the scope and spirit of embodiments of the present disclosure.

At step 310, estimated 3D keypoints for a 3D body are received. In an embodiment, the estimated 3D keypoints are predicted by a neural network by processing a 2D image of the 3D body. In an embodiment, the neural network is trained in a weakly-supervised manner to estimate 3D positions of 26 body keypoints. In contrast with conventional techniques, no annotations (e.g., ground truth, labels) are needed for the shape of the 3D body. In an embodiment, the 3D body model is a human body model. In an embodiment, the 3D body model is a model of an animal, robot, or other object that may change in pose and/or shape.

At step 320, a set of geometric transformations is computed that align extracted 3D keypoints for a 3D mesh model with the estimated 3D keypoints. In an embodiment, the extracted 3D keypoints are received. In an embodiment, the extracted 3D keypoints are calculated for the 3D mesh model to correspond with a kinematic structure of the estimated 3D keypoints. In an embodiment the set of geometric transformations is a set of rotations. The set of rotations may define initial pose parameters for articulating the canonical mesh.

At step 325, based on a kinematic structure of the 3D mesh model, at least one twist resulting from application of the geometric transformations to the extracted 3D keypoints is removed to produce pose parameters for the 3D mesh model. In an embodiment, removing the at least one twist comprises converting an initial set of rotations defined by the geometric transformations into local rotations including a local rotation for each one of the extracted 3D keypoints and computing the pose parameters by removing a twist component of the local rotations and retaining a swing component.

At step 330, the 3D mesh model is articulated according to the pose parameters to produce an articulated 3D mesh model that approximates a pose of the 3D body. In an embodiment, the articulated 3D mesh model is translated and scaled based on the estimated 3D keypoints. In an embodiment, at least one of the pose parameters or shape parameters for the 3D mesh model is adjusted based on differences between the estimated 3D keypoints and articulated 3D keypoints extracted from the articulated 3D mesh model. In an embodiment, at least one of the pose parameters or shape parameters for the 3D mesh model is adjusted based on differences between first locations of the estimated 3D keypoints projected to 2D according to a camera position and second locations of articulated 3D keypoints extracted from the articulated 3D mesh model and projected to 2D according to the camera position.

In an embodiment, an articulated 3D mesh of a 3D body is recovered based only on estimated 3D keypoints produced from an image of the 3D body. The 3D keypoints may be estimated from a single 2D image. The 3D mesh estimation technique is a 3D keypoint aware approach for articulating a canonical mesh using 3D keypoint positions and a set of geometrical operations to produce an articulated 3D mesh. The resulting articulated 3D mesh is accurate and aligns well with image content. In contrast to existing methods, the approach does not require any 3D annotations and provides an articulated 3D mesh in the absolute camera coordinate system.

Parallel Processing Architecture

Figure 4:
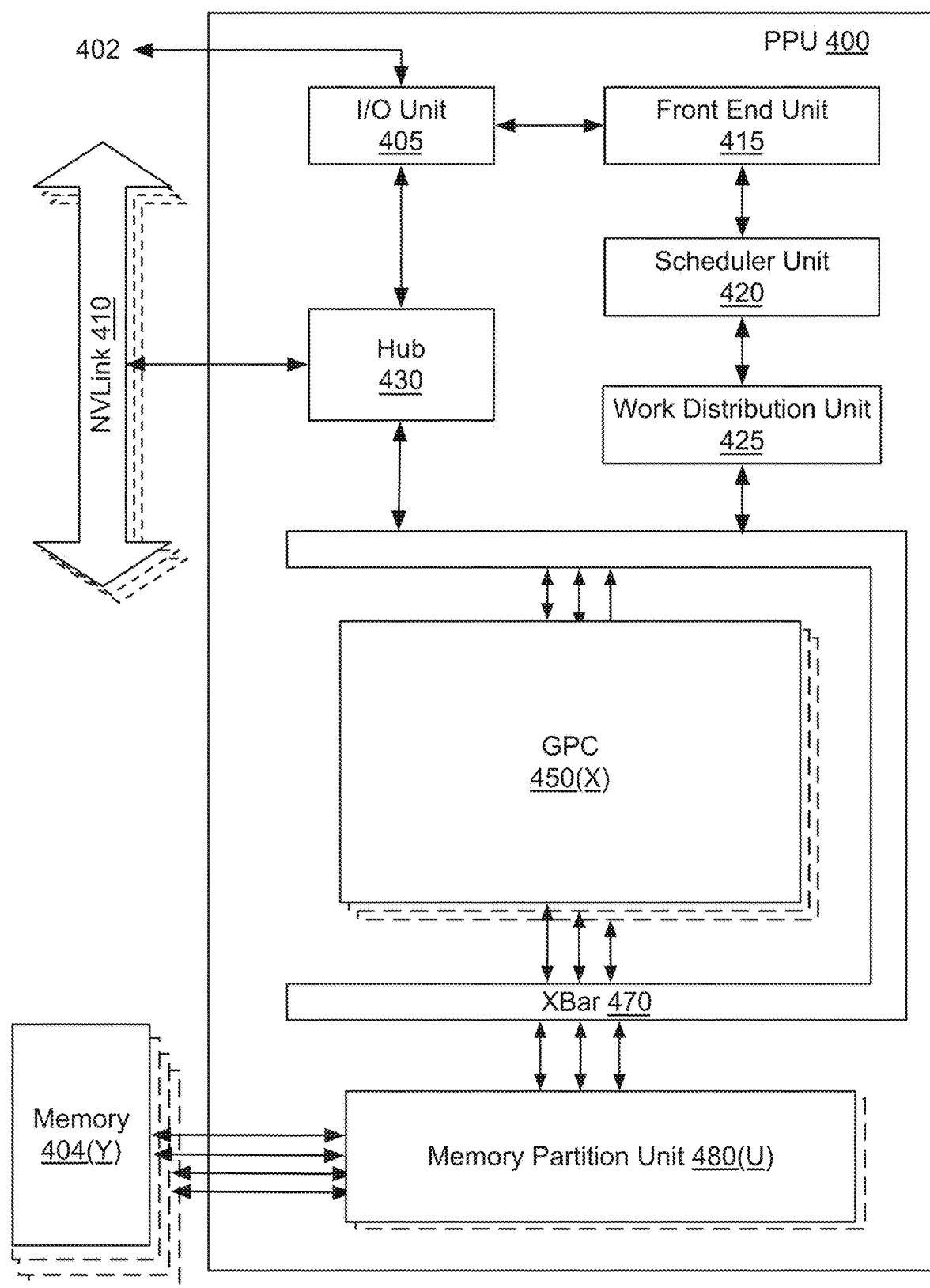
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the method 200 and/or 300. The PPU 400 may be used to implement one or more of the 3D mesh estimation systems 100 and 250 of FIGS. 1A and 2B. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
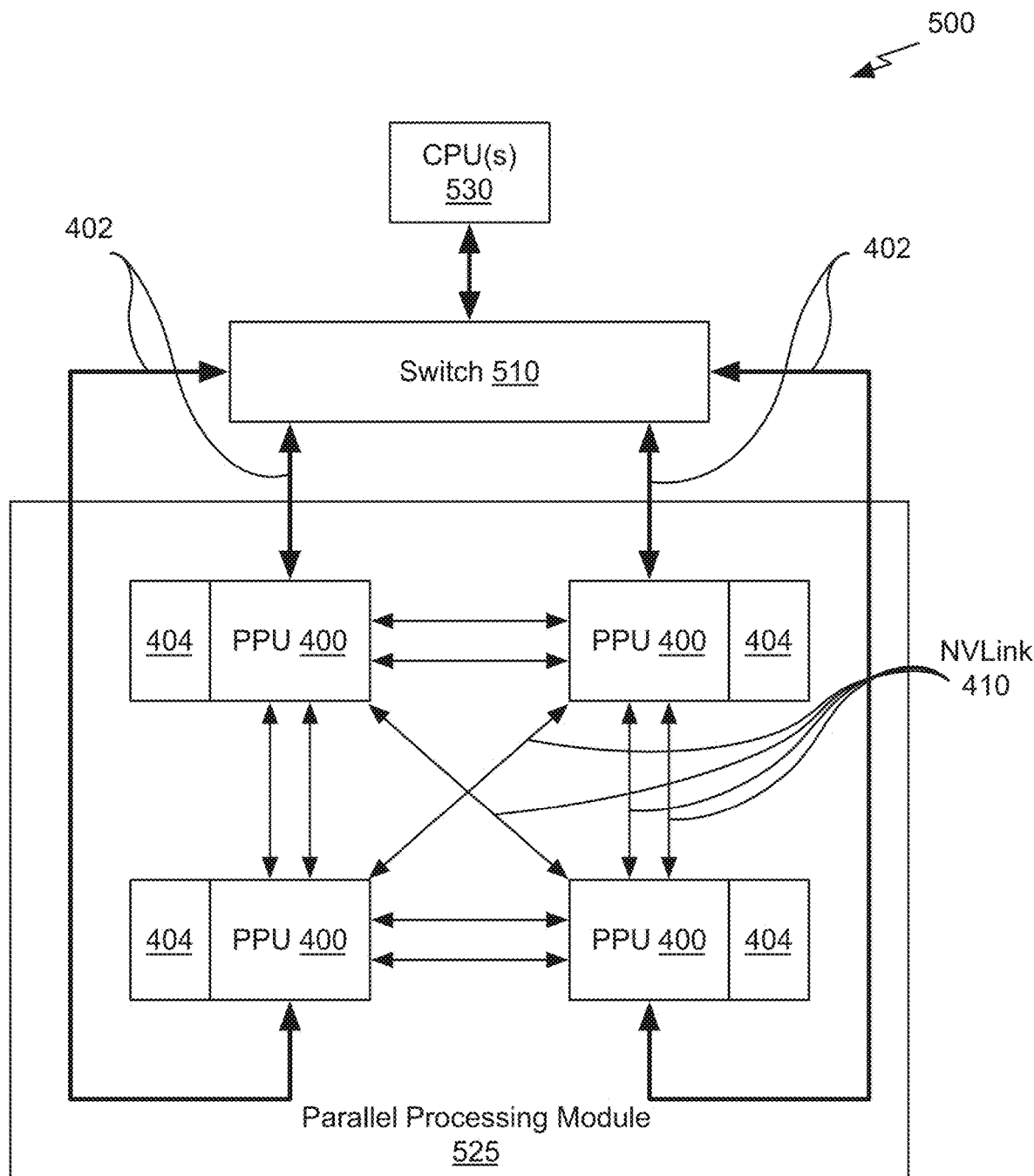
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 500 may be configured to implement the method 200 shown in FIG. 2A and/or the method 300 shown in FIG. 3B. The processing system 500 includes a CPU 530, switch 510, and multiple PPUs 400, and respective memories 404.

In an embodiment, at least one PPU 400 is replaced with a processor that may include hundreds or thousands of cores that are capable of handling hundreds or thousands of software threads simultaneously. The processor may include, and/or be configured to perform functions of, one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

Figure 5B:
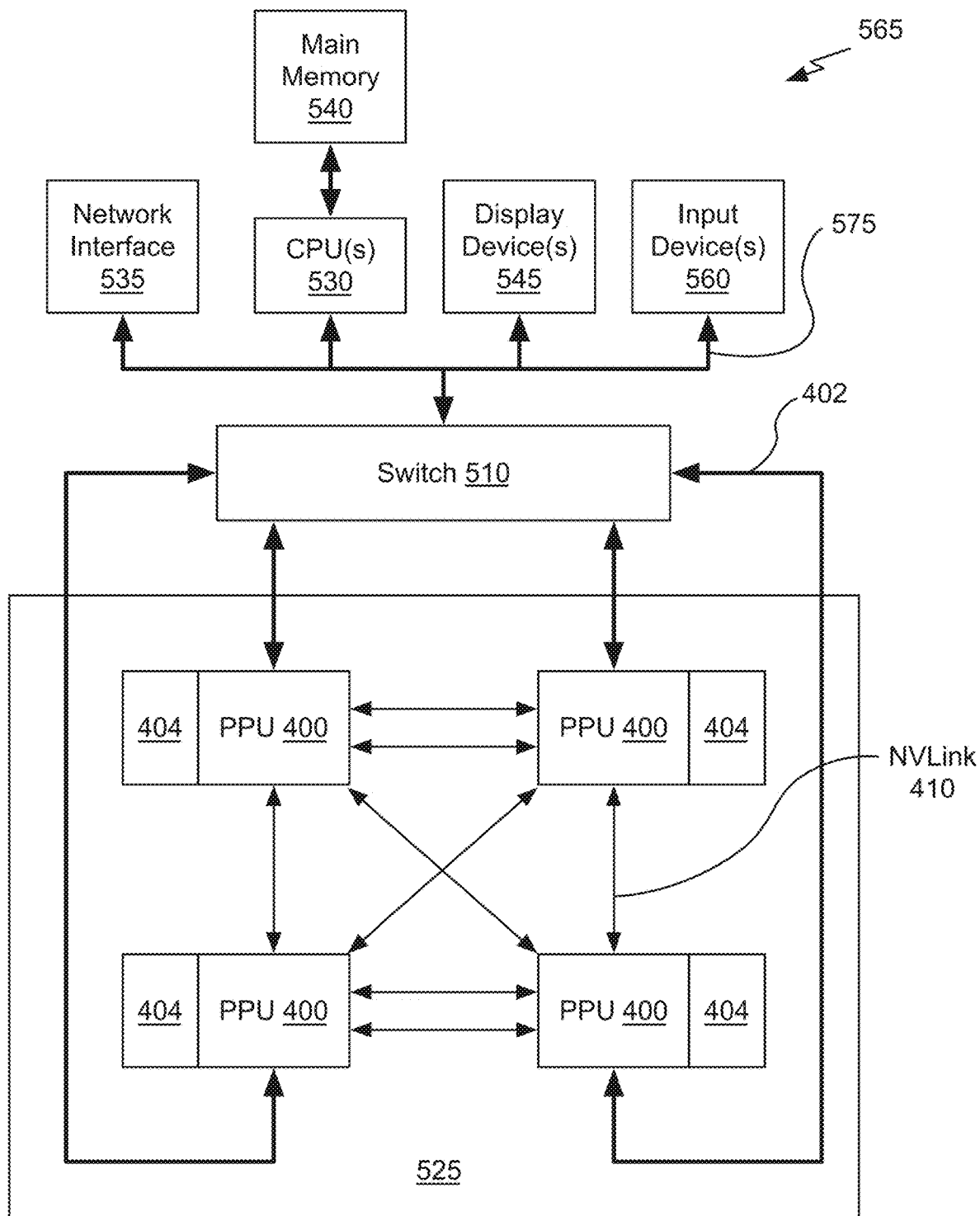
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 200 shown in FIG. 2A and/or the method 300 shown in FIG. 3B.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5B are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5B is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5B.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5A and/or exemplary system 565 of FIG. 5B. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images and/or pose parameters generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images and/or pose parameters may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images and/or pose parameters generated applying one or more of the techniques disclosed herein may be used to convey information to users of such machines, robots, and vehicles.

Figure 5C:
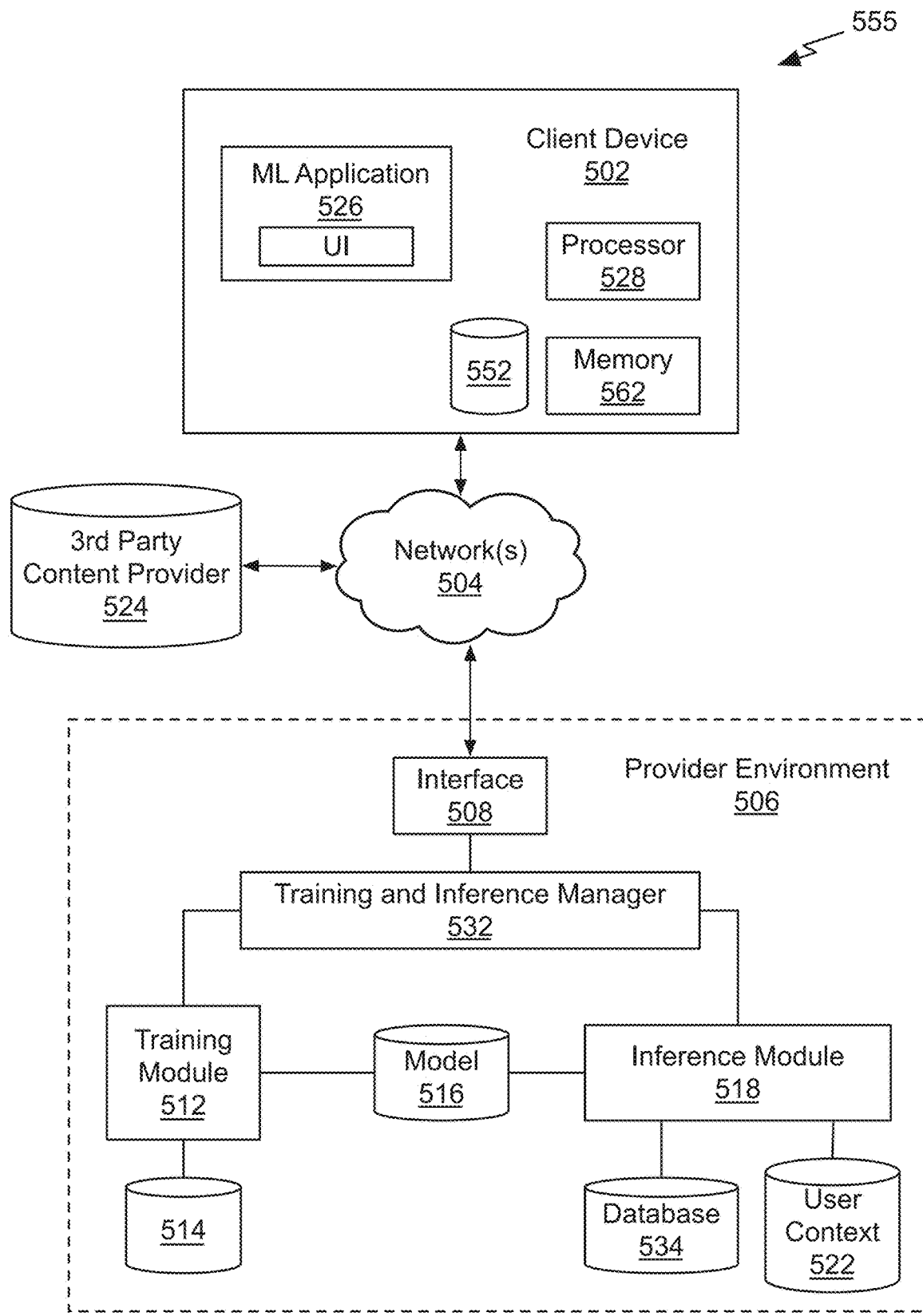
FIG. 5C illustrates components of an exemplary system that can be used to train and utilize machine learning, in at least one embodiment.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
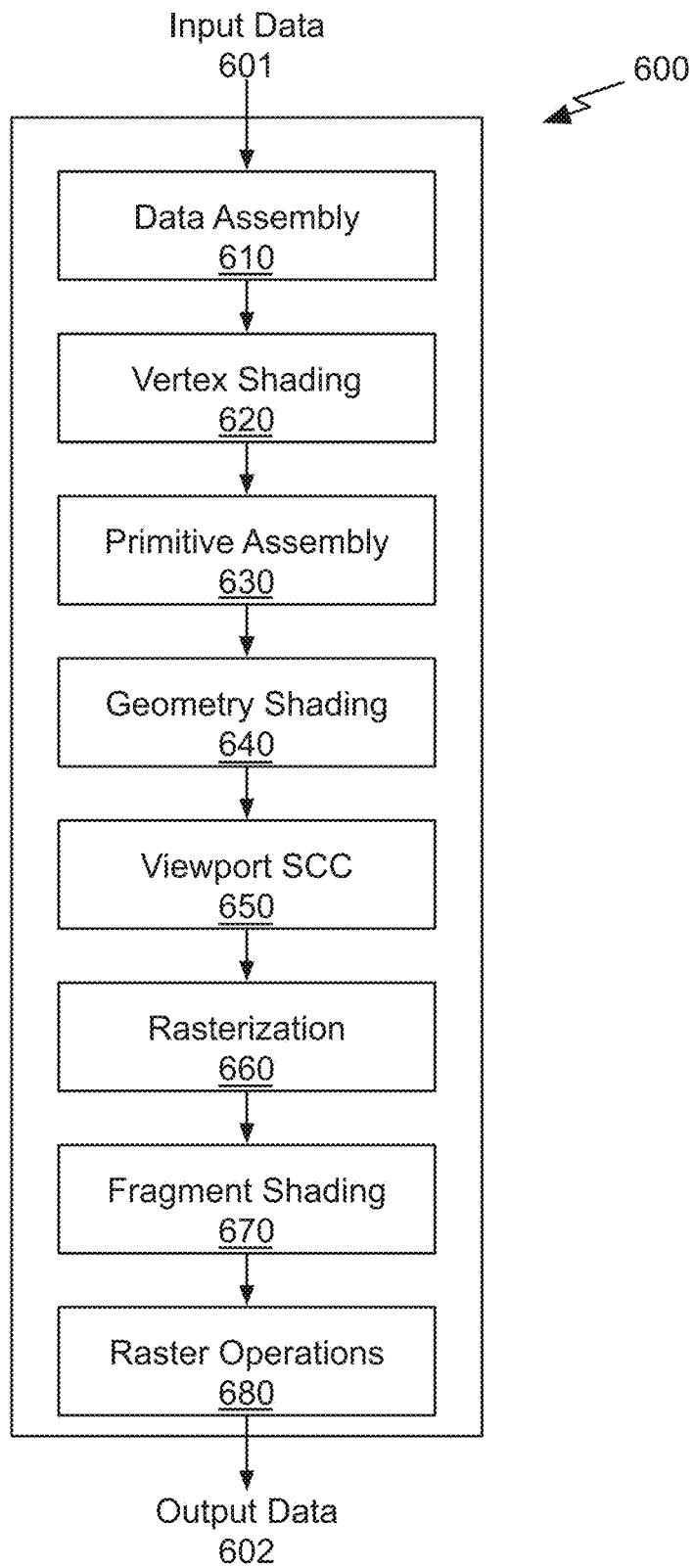
FIG. 6A is a conceptual diagram of a graphics processing pipeline implemented by the PPU of FIG. 4 suitable for use in implementing some embodiments of the present disclosure.

FIG. 6A is a conceptual diagram of a graphics processing pipeline 600 implemented by the PPU 400 of FIG. 4, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the processing unit within the PPU 400.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 600 utilizing the hardware of the PPU 400.

Various programs may be executed within the PPU 400 in order to implement the various stages of the graphics processing pipeline 600. For example, the device driver may launch a kernel on the PPU 400 to perform the vertex shading stage 620 on one processing unit (or multiple processing units). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images or pose parameters generated by the system or processor may be streamed over the network to the display device. Such streaming allows, for example, video games or other applications, which render images or compute pose parameters, to be executed on a server, a data center, or in a cloud-based computing environment and the rendered images or pose parameters to be transmitted to or from one or more user devices (such as a computer, video game console, smartphone, other mobile device, etc.) that are physically separate from the server or data center. Hence, the techniques disclosed herein can be applied to enhance the images that are streamed and to enhance services that stream data and images such as NVIDIA GeForce Now (GFN), Google Stadia, and the like.

Example Streaming System

Figure 6B:
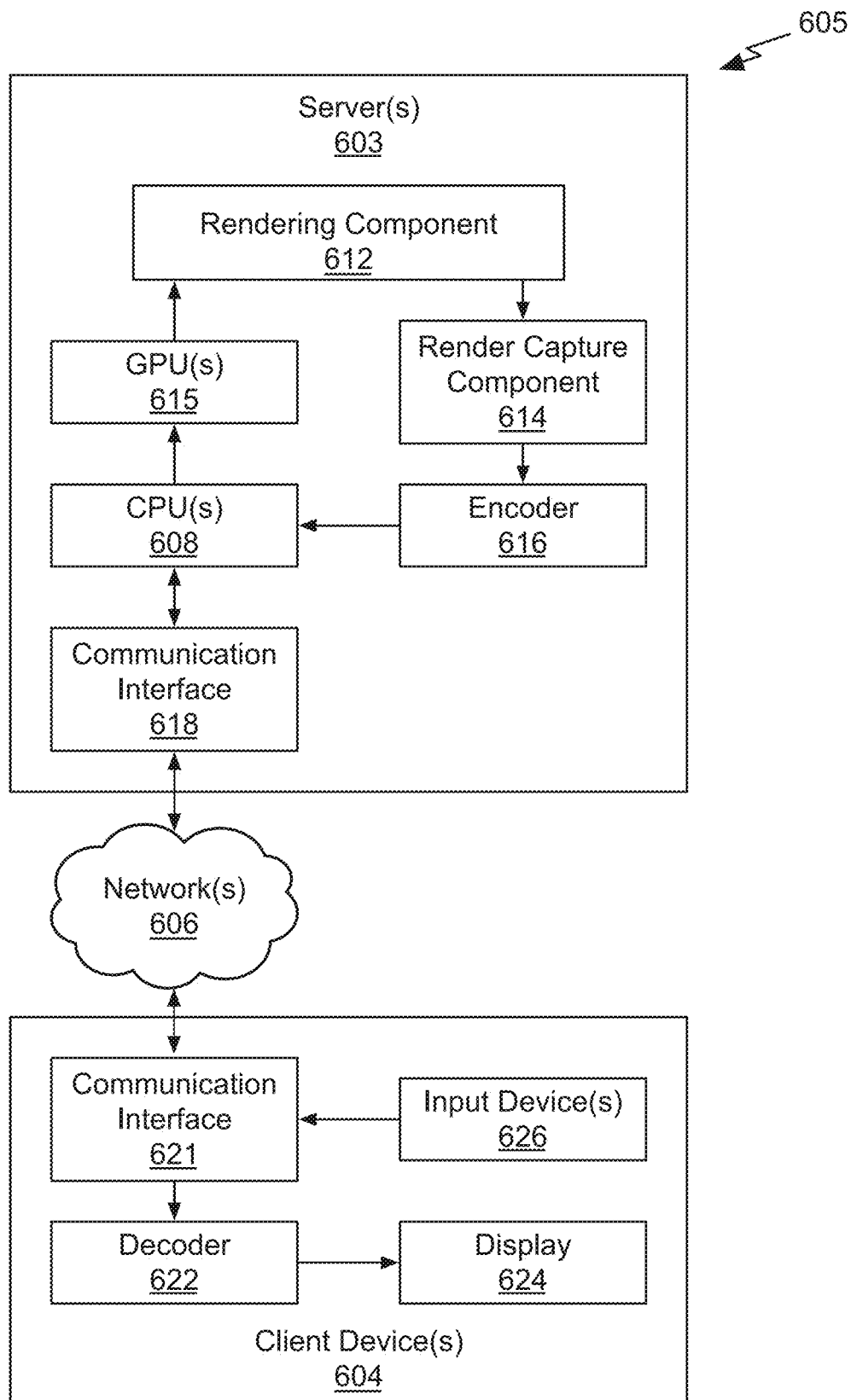
FIG. 6B illustrates an exemplary streaming system suitable for use in implementing some embodiments of the present disclosure.

FIG. 6B is an example system diagram for a streaming system 605, in accordance with some embodiments of the present disclosure. FIG. 6B includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In an embodiment, the streaming system 605 is a game streaming system and the sever(s) 604 are game server(s). In the system 605, for a game session, the client device(s) 604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
   receiving estimated three-dimensional (3D) keypoints for a 3D body;
   computing a set of geometric transformations that align extracted 3D keypoints for a 3D mesh model with the estimated 3D keypoints;
   converting an initial set of rotations defined by the set of geometric transformations into local rotations including a local rotation for each one of the extracted 3D keypoints;
   computing pose parameters for the 3D mesh model by removing a twist component of the local rotations and retaining a swing component; and
   articulating the 3D mesh model according to the pose parameters to produce an articulated 3D mesh model that approximates a pose of the 3D body.

2. The computer-implemented method of claim 1, further comprising receiving the extracted 3D keypoints.

3. The computer-implemented method of claim 1, further comprising calculating the extracted 3D keypoints for the 3D mesh model to correspond with a kinematic structure of the estimated 3D keypoints.

4. The computer-implemented method of claim 1, wherein the estimated 3D keypoints are predicted by a neural network by processing a two-dimensional (2D) image of the 3D body.

5. The computer-implemented method of claim 1, further comprising adjusting at least one of the pose parameters or shape parameters for the 3D mesh model based on differences between the estimated 3D keypoints and articulated 3D keypoints extracted from the articulated 3D mesh model.

6. The computer-implemented method of claim 1, further comprising adjusting at least one of the pose parameters or shape parameters for the 3D mesh model based on differences between first locations of the estimated 3D keypoints projected to 2D according to a camera position and second locations of articulated 3D keypoints extracted from the articulated 3D mesh model and projected to 2D according to the camera position.

7. The computer-implemented method of claim 1, further comprising translating and scaling the articulated 3D mesh model based on the estimated 3D keypoints.

8. The computer-implemented method of claim 1, wherein the 3D body model is a human body model.

9. The computer-implemented method of claim 1, wherein the 3D body model is an animal.

10. The computer-implemented method of claim 1, wherein the 3D body model is a machine or robot.

11. The computer-implemented method of claim 1, wherein at least one of the steps of receiving, computing, converting, computing, and articulating are performed on a server or in a data center to produce the pose parameters, and the pose parameters or the articulated 3D mesh model are streamed to a user device.

12. The computer-implemented method of claim 1, wherein at least one of the steps of receiving, computing, converting, computing, and articulating are performed within a cloud computing environment.

13. The computer-implemented method of claim 1, wherein at least one of the steps of receiving, computing, converting, computing, and articulating are performed for training, testing, or certifying a neural network employed in a machine, robot, or autonomous vehicle.

14. The computer-implemented method of claim 1, wherein at least one of the steps of receiving, computing, converting, computing, and articulating is performed on a virtual machine comprising a portion of a graphics processing unit.

15. A system, comprising:
a memory that stores a 3D mesh model; and
a processor that is connected to the memory, wherein the processor is configured to estimate a pose of a 3D body by:
receiving estimated three-dimensional (3D) keypoints for the 3D body;
computing a set of geometric transformations that align extracted 3D keypoints for the 3D mesh model with the estimated 3D keypoints;
converting an initial set of rotations defined by the set of geometric transformations into local rotations including a local rotation for each one of the extracted 3D keypoints;
computing pose parameters for the 3D mesh model by removing a twist component of the local rotations and retaining a swing component; and
articulating the 3D mesh model according to the pose parameters to produce an articulated 3D mesh model that approximates the pose of the 3D body.

16. The system of claim 15, wherein the estimated 3D keypoints are predicted by a neural network by processing a two-dimensional (2D) image of the 3D body.

17. The system of claim 15, further comprising adjusting at least one of the pose parameters or shape parameters for the 3D mesh model based on differences between the estimated 3D keypoints and articulated 3D keypoints extracted from the articulated 3D mesh model.

18. The system of claim 15, further comprising adjusting at least one of the pose parameters or shape parameters for the 3D mesh model based on differences between first locations of the estimated 3D keypoints projected to 2D according to a camera position and second locations of articulated 3D keypoints extracted from the articulated 3D mesh model and projected to 2D according to the camera position.

19. A non-transitory computer-readable media storing computer instructions that, when executed by one or more processors, cause the one or more processors to perform the steps of:
receiving estimated three-dimensional (3D) keypoints for a 3D body;
computing a set of geometric transformations that align extracted 3D keypoints for a 3D mesh model with the estimated 3D keypoints;
converting an initial set of rotations defined by the set of geometric transformations into local rotations including a local rotation for each one of the extracted 3D keypoints;
computing pose parameters for the 3D mesh model by removing a twist component of the local rotations and retaining a swing component; and
articulating the 3D mesh model according to the pose parameters to produce an articulated 3D mesh model that approximates a pose of the 3D body.

20. The non-transitory computer-readable media of claim 19, wherein the estimated 3D keypoints are predicted by a neural network by processing a two-dimensional (2D) image of the 3D body.

* * * * *